United States Patent [19]
Albrecht

[11] Patent Number: 5,000,490
[45] Date of Patent: * Mar. 19, 1991

[54] ADAPTER FITTING

[76] Inventor: David E. Albrecht, 1383 Granary. Rd., Blue Bell, Pa. 19422

[*] Notice: The portion of the term of this patent subsequent to Dec. 26, 2007 has been disclaimed.

[21] Appl. No.: 448,762

[22] Filed: Dec. 11, 1989

[51] Int. Cl.⁵ ............................................. F16L 35/00
[52] U.S. Cl. .................................... 285/39; 285/212; 285/368
[58] Field of Search .................. 285/12, 39, 368, 412, 285/413, 414, 415, 337, 212, 219, 220

[56] References Cited
U.S. PATENT DOCUMENTS

| | | | |
|---|---|---|---|
| 2,701,871 | 2/1955 | Rauch | 285/918 X |
| 3,074,748 | 1/1963 | Ulrich | 285/355 X |
| 3,240,515 | 3/1966 | Schmohl | 285/212 |
| 3,259,404 | 7/1966 | Papenguth | 285/212 |
| 4,690,436 | 9/1987 | Hehl | 285/348 |
| 4,822,080 | 4/1989 | Darish | 285/179 |
| 4,887,850 | 12/1989 | Albrecht | 285/137.1 |
| 4,889,369 | 12/1989 | Albrecht | 285/39 |

Primary Examiner—Dave W. Arola
Attorney, Agent, or Firm—Frank A. Follmer

[57] ABSTRACT

An adapter fitting made of two parts, a mounting member containing a fluid cavity and a flange member having bolt holes therein, is designed to enable fluid flow components of the type which can be bolted together and provide sealing at mating faces to be used with threaded connections and bolt-on flange connections.

16 Claims, 3 Drawing Sheets

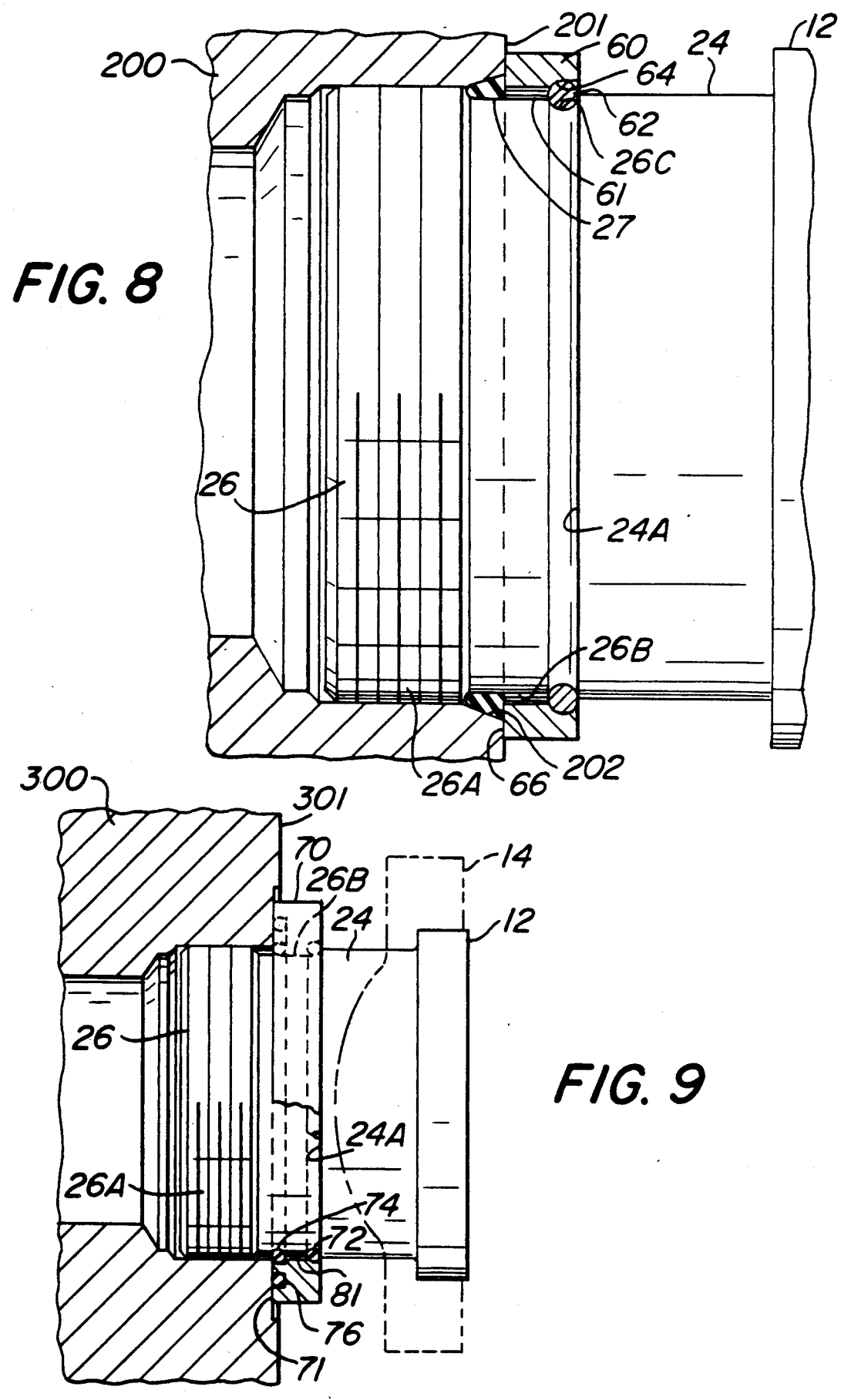

ADAPTER FITTING

BACKGROUND OF THE INVENTION

This invention relates to the art of fluid flow piping systems and, more particularly, to adapter fittings for use in such systems.

Fluid flow components of the type which can be bolted together and provide sealing at mating faces offer many advantages over conventional piping and control systems. These advantages include sealing integrity, a minimum number of joints, and compact overall dimensions. Fluid flow components of the indicated type can be used at any outlet that has a bolt-on flange configuration. However, it would be desirable to be able to adapt the fluid flow components of the indicated type for use with many types of outlets, in addition to the bolt-on flange configuration, since this should increase the number of applications that can benefit from the advantages thereof. In particular, it would be desirable to be able to use these fluid flow components with positive sealing type thread connections such as the SAE straight-thread connections.

In my copending applications Serial No. 776,497 filed Sept. 16, 1985 and now Patent No. 4,889,369 Serial No. 420,891, filed Oct. 13, 1989, there is taught how to effectively adapt a threaded port or threaded connection to a flange port or a flange port and there is disclosed an adapter fitting which enables fluid flow components of the indicated type to be used with various types of outlets including the positive sealing threaded connections and bolt-on flange connections. The present invention is another form of adapter fitting of the type disclosed in said copending applications.

In some applications when the threaded port and its fitting include a separate sealing means, the shoulder of the fitting generally has to be made radially larger than the diameter of the threaded port in order to retain the seal in its sealing cavity and, therefore, maintain the integrity of its sealing surfaces. In some of these cases, in order to employ an adapter fitting of the type described in said prior applications, it will require a new threaded adapter flange mount with a larger shoulder portion. This is necessary in order to adequately retain the sealing means and provide an adequate bearing surface for the adapter to be fastened against the face of the corresponding threaded port. Such a new adapter mount with its enlarged shoulder portion will therefore require a new flange portion with a bore designed to accommodate it. In order to make one size adapter mount and its corresponding flange applicable to many types of thread systems, and thereby reduce the manufacturing and inventory costs involved, etc., there is described herein a novel shoulder means for use with an adapter fitting in accordance with said prior mentioned applications. This shoulder means comprises a separate seal retaining ring in order to eliminate the need to make the basic threaded adapter mount larger and avoid the need to provide an additional special flange to accommodate this mount.

It will be apparent to those skilled in the art that this novel design has many advantages. For example, an important advantage is the great reduction in the number of special larger threaded adapter mounts and their corresponding special flanges that would be necessary without the invention.

BRIEF DESCRIPTION OF THE DRAWINGS

FIG. 8 is a detail view showing a second type of shoulder means.

FIG. 9 is a detail view showing a third type of shoulder means.

DETAILED DESCRIPTION OF THE PREFERRED EMBODIMENTS

Figure 1:
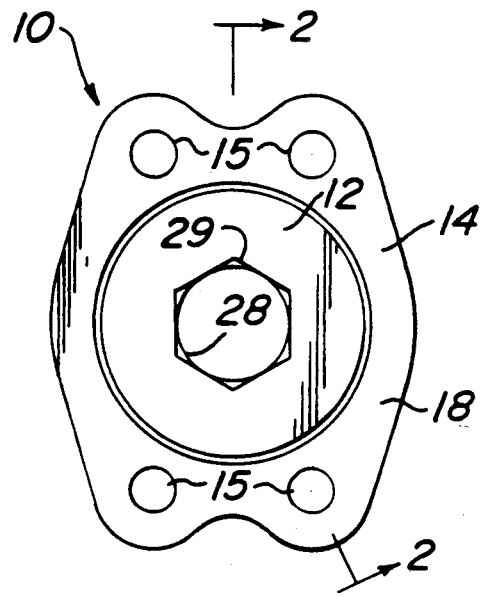
FIG. 1 is a front elevation of an adapter fitting in accordance with the invention.
Figure 2:
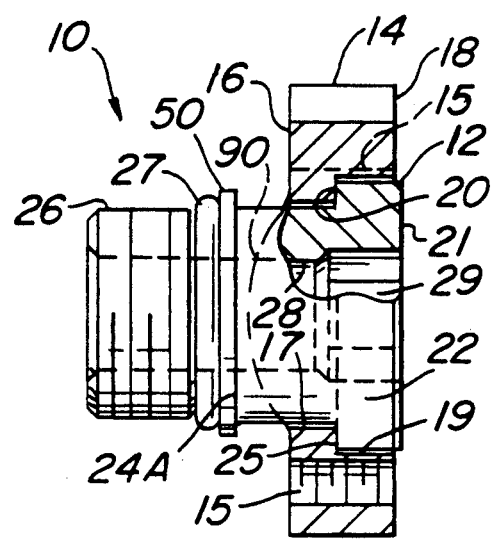
FIG. 2 is a sectional view taken generally on line 2—2 of FIG. 1.

In FIGS. 1 and 2, there is shown an adapter fitting 10 for converting a straight threaded port to a flange port. Adapter fitting 10 comprises two parts, namely, a mounting member 12 and a flange member 14.

Flange member 14 is provided with four threaded bolt holes 15 arranged in a bolt pattern comprising a rectangular configuration (pursuant to the SAE standard) as is best shown in FIG. 1. Flange member 14 has a cylindrical bore extending between the spaced apart, parallel faces 16 and 18 thereof and located in the center of the bolt pattern. This central bore comprises a bore portion 17 extending inwardly from face 16 and a bore portion 19 extending inwardly from face 18. Bore portion 19 has a larger diameter than bore portion 17 whereby they meet at an annular shoulder 20.

Flange member 14 is configured to use less material while achieving the same strength as the rectangular flange members used in the adapter fitting shown in said copending application Serial No. 776,497, for example Briefly, this is achieved by the raised rib design described in said copending application Serial No. 420,819, which design gives the needed strength while using a reduced amount of material. As described in detail in said application Serial No. 420,819, the flange member is designed to provide a greater thickness along the portions thereof extending between the long legs of the rectangular bolt hole pattern so as to withstand the greater moment forces applied thereto during use and so as to maintain a uniform stress throughout the flange member during use. To this end, flange member 14 has a reduced thickness in the upper and lower regions extending horizontally between the bolt holes 15 along the short legs of the rectangular pattern. Further, flange member 14 has a larger thickness, provided by a pair of raised ribs 90, extending generally vertically between the bolt holes 15 along the long legs of the rectangular pattern. Also, flange member 14 is provided with rounded corners and reduced height and width dimensions where possible without reducing the strength thereof.

Mounting member 12 has a cylindrical shape and is positioned in the central bore portions 17 and 19 in the center of the bolt pattern of flange member 14 and is adapted to be fastened to the threaded connection of a compatible threaded port such as a fluid flow component that terminates at a straight threaded outlet port. Mounting member 12 has an enlarged diameter portion 22 received in the large bore portion 19 of flange member 14, a reduced diameter portion 24 received in the smaller bore portion 17 of flange member 14, and an annular shoulder 25 as is shown in FIG. 2. By this construction, annular shoulder 25 of mounting member 12 is arranged to mate with the annular shoulder 20 of flange member 14 so as to limit relative movement therebetween in one direction for holding the parts in the position as shown in FIG. 2. The reduced diameter portion 24 of mounting member 12 extends beyond or outwardly from the face 16 of flange member 14 and terminates at an externally threaded end portion 26.

Mounting member 12 is provided with a central axially extending bore 28 providing a fluid flow passage which extends completely through the mounting member 12 from the threaded end 26 to the annular face 21 thereof which extends slightly beyond the face 18 of flange member 14 when shoulders 20 and 25 mate as is apparent from a consideration of FIG. 2. It is important that face 21 extend slightly beyond face 18 so as not to interfere with the sealing means that cooperate with face 21.

Mounting member 12 is provided with a wrenching surface 29 to aid in fastening the mounting member 12 to the threaded outlet. As shown in FIGS. 1 and 2, wrenching surface 29 comprises an internally broached hexagonal configuration. However, it will be apparent that other types of wrenching surfaces may be employed, such as spanner holes or the like. By providing the wrenching surface 29 internally of the mounting member 12 and extending it inwardly from the face 21 thereof, the design allows for a mounting that is of a minimum length.

It will be noted that the face of the component bolted to the flange member 14 of adapter fitting 10 will have a seal extending around the fluid passage bore 28. This sealing is accomplished as the seal meets the face 21 of the mounting member 12 in an area extending around the opening of fluid passage bore 28 therein. It will be noted that the flange member 14 participates in the fastening of adapter fitting 10 to the fluid components, but is not involved in any sealing action, the fluid passage bore 28 being entirely enclosed within the mounting member 12.

End portion 26 comprises external threads 26A extending from the outer end thereof inwardly a substantial distance and a shallow circumferential recess 26B located at the inward end of threads 26A. Recess 26B is located between the inward end of the threads 26A and a narrow, radially extending annular shoulder 24A formed on body portion 24. The recess 26B and shoulder 24A are shown in detail in FIG. 7. An 0-ring seal 27 is mounted on end portion 26 at the outer portion of recess 26B and extends around the circumference of end portion 26. 0-ring seal 27 is made of a resilient material and functions as a resilient sealing means extending around the exterior surface of the end portion 26 of mounting member 12 for providing sealing contact with the threaded port of a flow component engaged by the threads 26A during the use of the adapter fitting 10.

Figure 7:
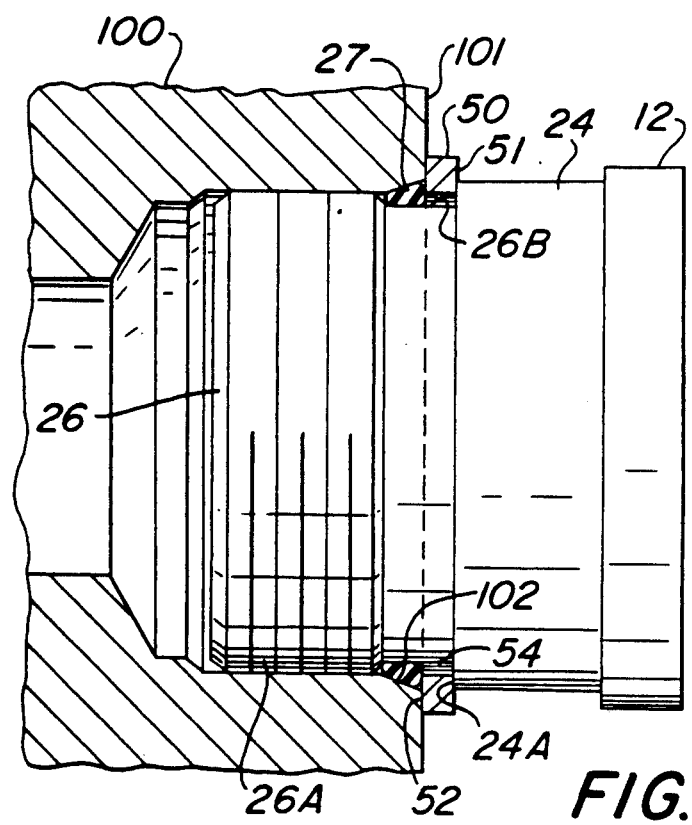
FIG. 7 is a detail view showing the shoulder means employed on the adapter fitting shown in FIGS. 1 and 2.

In accordance with a novel feature of the invention, adapter fitting 10 comprises means providing a shoulder on mounting member 12 at a location adjacent the inward end of threads 26A of end portion 26 and arranged to contact the face of a flow component engaged with said threads 26A during the use of the adapter fitting 10. The novel shoulder means functions to retain the 0-ring seal 27 in the seal cavity of the threaded port of the flow component on which adapter fitting 10 is mounted and to provide an adequate bearing surface for the adapter fitting 10 when the mounting member 12 is fastened against the face of said threaded port as is shown in FIG. 7, which shows flow component 100 having face 101 and seal cavity 102. To this end, the shoulder means includes an annular, washer-like metallic member 50 mounted on mounting member 12 at the recess 26B at the inward end of the threads 26A. The annular member 50 may be made of a mild steel (such as C-1018) and provides a pair of sealing faces 51 and 52, as best shown in FIG. 7. One sealing face 51 is arranged to contact the shoulder 24A of the mounting member 12 and the other sealing face 52 is arranged to provide the shoulder of mounting member 12 which contacts the face 101 of the flow component 100 engaged by the threaded end portion 26 of mounting member 12 in the arrangement as shown in FIG. 7, which contact occurs when mounting member 12 bottoms out on said face 101 during installation.

It is important that the annular member 50 be constructed and arranged to fit properly on the mounting member 12 to achieve its desired function. Also, it is desirable that the annular member 50 be mounted so that it allows for ease of both assembly and disassembly thereof. To this end, the washer-like annular member 50 is provided with threads 54 on the inner rim thereof, said threads 54 being constructed and arranged to thread over the threads 26A of mounting member 12 in order to be positioned on the end portion 26 in the position shown in FIG. 7. The inside thread diameter of the annular member 50 is such that it fits closely to the recess 26B to prevent seal extrusion during use. In order to prevent seal extrusion in high pressure applications the threads 54 of member 50 can be plugged at their thread lead portion after assembly.

Figure 3:
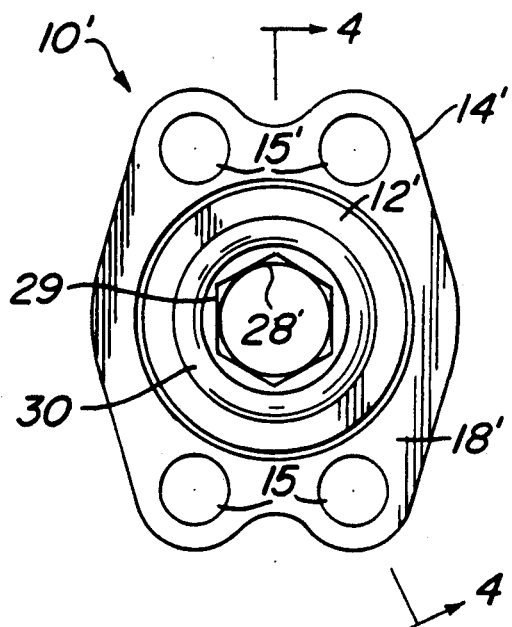
FIG. 3 is a front elevational view of another adapter fitting in accordance with the invention.
Figure 4:
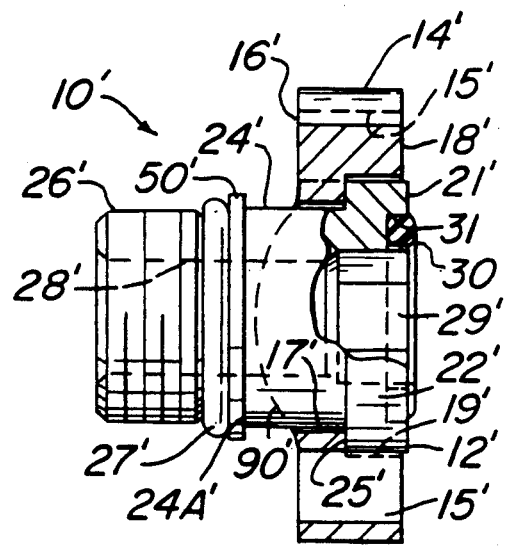
FIG. 4 is a sectional view taken generally on line 4—4 of FIG. 3.

In FIGS. 3 and 4 there is shown an adapter fitting 10' for converting a straight threaded port to a flange of a construction corresponding to the flange provided by adapter fitting 10. Adapter fitting 10' is essentially the same as adapter fitting 10 except that there is provided a face-mounted seal on the mounting member and the flange member is provided with through (non-threaded) bolt holes.

Further, as seen by a comparison of FIGS. 1 and 2 and FIGS. 3 and 4, adapter fitting 10' is comprised of parts having similar construction and dimension as corresponding parts of adapter fitting 10. Thus, corresponding parts of adapter fitting 10' have been provided with the same reference numerals as those of adapter fitting 10 with primes added.

Adapter fitting 10' is comprised of two parts, namely, a mounting member 12' and a flange member 14'. Flange member 14' is identical in construction with flange member 14 except that the four bolt holes 15' thereof, which are arranged in the identical rectangular configuration as bolt holes 15, are through (non-threaded) bolt holes. Thus, flange member 14' has a cylindrical bore comprised of bore portions 17' and 19' extending between faces 16' and 18' and meeting at an annular shoulder 20'. Mounting member 12' is cylindrical and is positioned in the central bore portions 17' and 19' in the center of the bolt pattern of flange member 14' and is adapted to be fastened to the threaded connection of a compatible threaded port, such as a fluid flow component that terminates at a straight threaded outlet port. Mounting member 12' has portions 22' and 24' which form an annular shoulder 25' arranged to mate with the annular shoulder 20' of flange member 14'. Portion 24' of mounting member 12' extends beyond face 16' of flange member 14' and terminates at an externally threaded end portion 26'.

End portion 26' has mounted thereon resilient 0-ring seal 27' and a shoulder providing means including annular washer-like metallic member 50' to provide the sealing contact with the internal wall portion of a threaded outlet port to which end portion 26' is threadedly engaged in the same manner as described above regarding adapter fitting 10 and as is illustrated in FIG. 7. The parts are configured so that adapter fitting 10' can be connected to a positive seal straight thread, such as the standard SAE straight threaded port as described above with respect to FIGS. 1 and 2.

Mounting member 12' is provided with a central axially extending bore 28' providing a fluid flow passage through adapter fitting 10'. Mounting member 12' is provided with a wrenching surface 29' formed of an internally broached hexagonal configuration, and arranged to extend inwardly from face 21' so as to provide a mounting that is of a minimum length.

An 0-ring sealing member 30 is mounted in an annular recess 31 in the face 21' of mounting member 12' and is constructed to project slightly from this face so as to provide good sealing contact with a fluid flow component mounted in face-to-face contact adjacent thereto. The wrenching portion 29' is located within the annular recess 31 as is apparent from FIG. 3.

Figure 5:
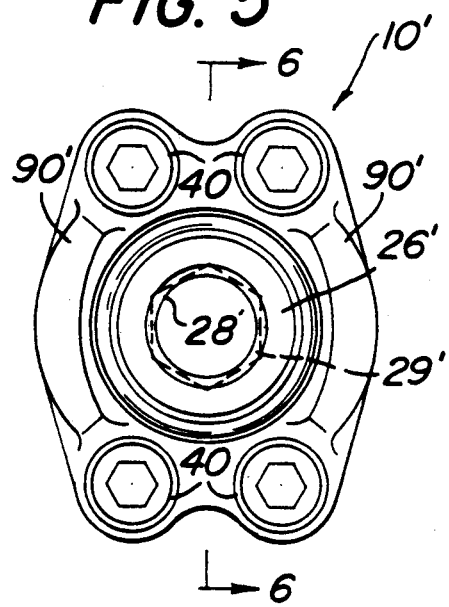
FIG. 5 is a front elevational view of a union comprising two adapter fittings in accordance with the invention.
Figure 6:
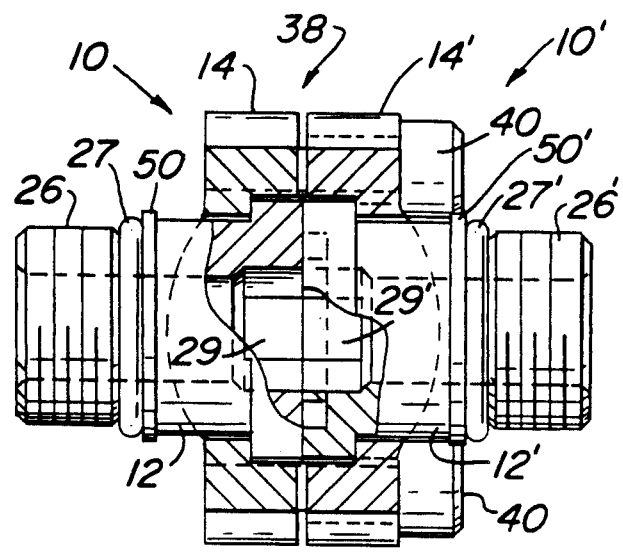
FIG. 6 is a sectional view taken generally on line 6—6 of FIG. 5.

In FIGS. 5 and 6 there is shown a preferred union flange connection wherein adapter fittings 10 and 10' are mounted together with their faces mating. This connection 38 ensures a virtually leakproof connection while affording easy component removal from a fluid flow system. Adapter fittings 10 and 10' are secured together in mating relationship by bolts 40 which are arranged to pass through the non-threaded holes 15 of adapter fitting 10 so as to draw and hold the two flange members 14 and 14' together. Sealing between the two opposing faces 21 and 21' is accomplished with the seal 30 provided in the face 21' of adapter fitting 10'. It will be apparent that the adapter fittings 10 and 10' may be connected to flow components having threaded ports by means of their threaded end portions 26 and 26', respectively.

The shoulder means shown in FIG. 7 comprises a washer-like annular member 50 that is fit closely to the diameter of recess 26B. This type of arrangement is preferably employed when the shoulder 24A of mounting member 12 substantially covers the seal cavity of the threaded port of the associated flow component and when the outside diameter of annular member 50 does not have to exceed more than approximately 135½% of the inward extension of its inside diameter. In FIG. 8, there is shown a shoulder means which is desirably employed when the "back-up" shoulder 24A of mounting member 12 does not substantially cover the seal cavity of the component port. In this case, there is provided an annular collar-like member 60, which is made of metal such as a mild steel, which has a substantial axial extent, and which is constructed and arranged to cooperate with a metallic snap ring 62 which is constructed and arranged to improve the positioning of said annular member 60 and to provide added joint integrity.

Snap ring 62, which may be made of a suitable mild steel or spring wire, is located within a recess 64 on the inner rim of member 60 at the axially inward end thereof so as to contact the shoulder 24A of mounting member 12 and is received in an annular recess 26C at said location. The annular member 60 is constructed similar to annular member 50 for assembly purposes and, to this end, is threaded into position on the end portion 26 across the threads 26A, whereby annular member 60 is provided with internal threads 61 on its inner rim which threads mate with the external threads 26A on end portion 26 of mounting member 12 as described above with respect to the embodiment shown in FIG. 7. As shown in FIG. 8, the shoulder means shown therein functions to retain the 0-ring seal 27 in the seal cavity of the threaded port of the flow component on which the adapter fitting 10 is mounted and to provide an adequate bearing surface for the adapter fitting 10 when its mounting member 12 is fastened against the face of said threaded port as is shown in FIG. 8, which shows flow component 200 having face 201 and seal cavity 202. The construction is such that annular member 60 has its snap ring 62 arranged to contact the shoulder 24A of the mounting member 12 and a sealing face 66 arranged to provide the shoulder of mounting member 12 which contacts face 201 of the flow component 200 engaged by the threaded portion 26 of the mounting member 12 in the arrangement as shown in FIG. 8.

In FIG. 9 there is shown a shoulder means constructed and arranged for mating with a female threaded port of the type of construction such that the port does not have a seal cavity at its terminal end. Accordingly, the shoulder means shown in FIG. 9 comprises an annular collar-like member 70, which is made of a metal such as mild steel, has a substantial axial extent and is constructed and arranged to cooperate with a metallic snap ring 72 similar to the arrangement of the snap ring 62 in member 60 of the embodiment shown in FIG. 8. Moreover, in order to adapt to the threaded port shown in FIG. 9, the annular member 70 is provided with an inner resilient 0-ring seal 74 arranged to seal the annular member 70 to the port adapter surface and a second resilient 0-ring seal 76 to seal the face 71 of the annular member 70 to the port body surface. The annular member 70 is also threaded into position on the end portion 26 across threads 26A and, to this end, is provided with internal threads 81 on its inner rim which threads mate with the external threads 26A on the mounting member 12 in the manner described above with respect to the embodiments shown in FIGS. 7 and 8. It will be apparent, as is shown in FIG. 9, that the shoulder providing means provides a sealing means for contacting the shoulder 24A of mounting member 12 and a sealing face 71 arranged to provide the shoulder of mounting member 12 which contacts the face 301 of the flow component 300 engaged by the threaded end portion 26 of mounting member 12 in the arrangement shown in FIG. 9, which contact occurs when mounting member 12 bottoms out on said face 301 during installation. Moreover, there is provided a resilient 0-ring seal 74 in the sealing face 71 to seal the annular member 70 to the exterior surface of the mounting member 12 of the adapter and a second 0-ring seal 76 which is arranged to seal the annular member 70 to the face 301 of the flow component 300.

It will be apparent that various changes may be made in the construction and arrangement of parts without departing from the scope of the invention as defined by the following claims. For example, variations and combinations may be made from the various shoulder means disclosed herein to accommodate the many thread and seal geometries found in the art.

What is claimed is:

1. An adapter fitting for connecting a threaded flow component and a face sealing flanged flow connector comprising:

a flange member having bolt holes arranged in a spaced apart pattern and a bore located centrally within said bolt hole pattern and extending through said flange member, and a mounting member mounted in said bore of said flange member and including a first body portion adapted to be held in arresting contact with said flange member and providing a face for mating with a flanged flow connector, a second body portion extending beyond said flange member to a location spaced therefrom, the extended end of said second body portion having a threaded portion for engagement with the threaded terminal port of a flow component, a fluid flow passage extending through said body portions, and a wrenching surface formed internally of said first body portion of said mounting member and adapted to be engaged by a wrenching mechanism for causing rotation of said mounting member, means providing a shoulder on said mounting member at a location adjacent the inward end of said threaded portion thereof and arranged to contact the face of the flow component engaged by the threaded portion of said mounting member, and resilient sealing means extending around the exterior surface of said extended end of said mounting member adjacent said shoulder for providing sealing contact with the threaded port of the flow component engaged by said threaded portion of said mounting member, said shoulder providing means including an annular member mounted on said mounting member at the inward end of said threaded portion thereof, said annular member providing a pair of radially extending faces, one of said faces being arranged to contact said mounting member, and the other of said faces being arranged to provide said shoulder.

2. An adapter fitting according to claim 1 wherein said shoulder providing means comprises a metallic washer received in a shallow groove at the inward end of said threaded portion of said mounting member.

3. An adapter fitting according to claim 2 wherein said washer has its inner rim threaded with threads that can threadedly engage said threaded portion of said mounting member.

4. An adapter fitting according to claim 1 wherein said wrenching surface is located to extend inwardly from said mating face of said first body portion of said mounting member.

5. An adapter fitting according to claim 4 wherein said wrenching surface is formed by a multi-sided hole extending inwardly from said one end of said fluid flow passage.

6. An adapter fitting according to claim 1 including means providing sealing contact between said mating face of said first body portion of said mounting member and a flanged flow connection connected adjacent thereto, said sealing means including a sealing member mounted on said mating face and extending around said one end of said fluid flow passage.

7. An adapter fitting according to claim 1 comprising a second adapter fitting including a second flange member and a second mounting member both constructed and arranged like said first-mentioned flange member and mounting member, respectively, of said first-mentioned adapter fitting, said second adapter fitting comprising means providing sealing contact between said mating face of said second mounting member of said second adapter and said mating face of said mounting member of said first adapter, said sealing means including a sealing member mounted on said second adapter mating face and extending around said fluid passage of said second adapter, and including means cooperable with said flange members of said first and second adapters for securing said first body portion of said mounting members of said first and second adapters together in mating face-to-face contact with said fluid flow passages thereof in flow communication, said last-mentioned sealing means of said second adapter providing sealing contact between the mating faces of said mounting members of said first and second adapters.

8. An adapter fitting for connecting a threaded flow component and a face sealing flanged flow connector comprising:

a flange member having bolt holes arranged in a spaced apart pattern and a bore located centrally within said bolt hole pattern and extending through said flange member, and a mounting member mounted in said bore of said flange member and including a first body portion adapted to be held in arresting contact with said flange member and providing a face for mating with a flanged flow connector, a second body portion extending beyond said flange member to a location spaced therefrom, the extended end of said second body portion having a threaded portion for engagement with the threaded terminal port of a flow component, a fluid flow passage extending through said body portions, and a wrenching surface formed internally of said first body portion of said mounting member and adapted to be engaged by a wrenching mechanism for causing rotation of said mounting member, means providing a shoulder on said mounting member at a location adjacent the inward end of said threaded portion thereof and arranged to contact the face of the flow component engaged by the threaded portion of said mounting member, and resilient sealing means extending around the exterior surface of said extended end of said mounting member adjacent said shoulder for providing sealing contact with the threaded port of the flow component engaged by said threaded portion of said mounting member, said shoulder providing means including an annular member mounted on said mounting member at the inward end of said threaded portion thereof, said annular member providing a radially extending face arranged to provide said shoulder.

9. An adapter fitting according to claim 8 wherein said shoulder providing means includes a ring-shaped means extending around said mounting member in contact between said annular member and the exterior of said mounting member.

10. An adapter fitting according to claim 9 wherein said shoulder providing means comprises a metallic collar received in a shallow groove at the inward end of said threaded portion of said mounting member.

11. An adapter fitting according to claim 8 wherein said wrenching surface is located to extend inwardly from said mating face of said first body portion of said mounting member.

12. An adapter fitting according to claim 11 wherein said wrenching surface is formed by a multi-sided hole extending inwardly from said one end of said fluid flow passage.

13. An adapter fitting for connecting a threaded flow component and a face sealing flanged flow connector comprising:
 a flange member having bolt holes arranged in a spaced apart pattern and a bore located centrally within said bolt hole pattern and extending through said flange member,
 and a mounting member mounted in said bore of said flange member and including
 a first body portion adapted to be held in arresting contact with said flange member and providing a face for mating with a flanged flow connector,
 a second body portion extending beyond said flange member to a location spaced therefrom, the extended end of said second body portion having a threaded portion for engagement with the threaded terminal port of a flow component,
 a fluid flow passage extending through said body portions, and
 a wrenching surface formed internally of said first body portion of said mounting member and adapted to be engaged by a wrenching mechanism for causing rotation of said mounting member,
 means providing a shoulder on said mounting member at a location adjacent the inward end of said threaded portion thereof and arranged to contact the face of the flow component engaged by the threaded portion of said mounting member, and
 resilient sealing means extending around the exterior surface of said extended end of said mounting member adjacent said shoulder for providing sealing contact with the threaded port of the flow component engaged by said threaded portion of said mounting member,
 said shoulder providing means including an annular member mounted on said mounting member at the inward end of said threaded portion thereof, said annular member providing a radially extending face arranged to provide said shoulder,
 said shoulder providing means including at least one 0-ring sealing means mounted in said radial face of said annular member for contacting the face of the flow component engaged by the threaded portion of said mounting member.

14. An adapter fitting according to claim 13 wherein said shoulder providing means includes a second 0-ring sealing means mounted in said radial face at the inner rim of said annular member in sealing contact between said annular member and the exterior of said mounting member, said second resilient sealing means being spaced apart radially inwardly from said first-mentioned 0-ring sealing means.

15. An adapter fitting according to claim 13 wherein said wrenching surface is located to extend inwardly from said mating face of said first body portion of said mounting member.

16. An adapter fitting according to claim 15 wherein said wrenching surface is formed by a multi-sided hole extending inwardly from said one end of said fluid flow passage.

* * * * *